(12) United States Patent
Shim et al.

(10) Patent No.: US 9,134,469 B2
(45) Date of Patent: Sep. 15, 2015

(54) COMPOSITE FOR BLACK MATRIX RESIST, METHOD FOR MANUFACTURING BLACK MATRIX RESIST, COLOR FILTER ARRAY PANEL, AND METHOD FOR MANUFACTURING THE SAME

(71) Applicant: SAMSUNG DISPLAY CO., LTD., Yongin, Gyeonggi-Do (KR)

(72) Inventors: Woo Sub Shim, Asan-si (KR); Sung Woong Kim, Suwon-si (KR); Jang Sub Kim, Suwon-si (KR); Yoon Ho Kang, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 133 days.

(21) Appl. No.: 14/065,594

(22) Filed: Oct. 29, 2013

(65) Prior Publication Data

US 2014/0051781 A1     Feb. 20, 2014

Related U.S. Application Data

(62) Division of application No. 13/168,339, filed on Jun. 24, 2011, now Pat. No. 8,610,848.

(30) Foreign Application Priority Data

Feb. 9, 2011    (KR) .................. 10-2011-0011526

(51) Int. Cl.
| | | |
|---|---|---|
| *H01B 1/04* | (2006.01) | |
| *C01B 31/00* | (2006.01) | |
| *C01B 7/00* | (2006.01) | |
| *C01B 33/02* | (2006.01) | |
| *G02B 5/22* | (2006.01) | |
| *G02B 5/20* | (2006.01) | |
| *B82Y 30/00* | (2011.01) | |
| *C09D 183/08* | (2006.01) | |

(52) U.S. Cl.
CPC . *G02B 5/22* (2013.01); *B82Y 30/00* (2013.01); *C09D 183/08* (2013.01); *G02B 5/201* (2013.01); *Y10T 428/10* (2015.01)

(58) Field of Classification Search
CPC .................................. B82Y 30/00; H01B 1/04
USPC ........ 252/500, 502, 506, 518.1, 521.3, 521.5; 423/445 B, 449.1, 462; 977/734, 742
See application file for complete search history.

(56) References Cited

U.S. PATENT DOCUMENTS

| | | |
|---|---|---|
| 5,880,799 A | 3/1999 | Inoue et al. |
| 7,294,372 B2 | 11/2007 | Cok |
| 2004/0201048 A1 | 10/2004 | Seki et al. |
| 2005/0218819 A1 | 10/2005 | Eida |
| 2005/0239647 A1 | 10/2005 | Caspar et al. |
| 2006/0041053 A1 | 2/2006 | Kamata et al. |
| 2008/0151150 A1 | 6/2008 | Lee |
| 2009/0176914 A1 | 7/2009 | Gotoh |

FOREIGN PATENT DOCUMENTS

| | | |
|---|---|---|
| JP | 07-035915 A | 2/1995 |
| JP | 3328297 B2 | 7/2002 |
| JP | 2004-198717 A | 7/2004 |

(Continued)

*Primary Examiner* — Tri V Nguyen
(74) *Attorney, Agent, or Firm* — Cantor Colburn LLP

(57) ABSTRACT

A resist composition for a black matrix, the resist composition including carbon nanotubes, a halosulfonic acid, an alcohol, an ammonium hydroxide compound, and a fluorosilane.

20 Claims, 3 Drawing Sheets

(56) References Cited

FOREIGN PATENT DOCUMENTS

| | | |
|---|---|---|
| JP | 2006-163233 A | 6/2006 |
| JP | 2010-078972 A | 4/2010 |
| JP | 2010-186175 A | 8/2010 |
| JP | 2010-201821 A | 9/2010 |
| KR | 10-0785031 B1 | 12/2007 |
| KR | 102008065479 A | 4/2008 |
| KR | 102009025487 A | 3/2009 |
| KR | 102009115353 A | 11/2009 |
| KR | 102010016089 A | 2/2010 |

COMPOSITE FOR BLACK MATRIX RESIST, METHOD FOR MANUFACTURING BLACK MATRIX RESIST, COLOR FILTER ARRAY PANEL, AND METHOD FOR MANUFACTURING THE SAME

CROSS-REFERENCE TO RELATED APPLICATION

The present application is a divisional application of U.S. Non-Provisional Patent Application No. 13/168,339 filed on Jun. 24, 2011 claiming priority to and benefits of Korean Patent Application No. 10-2011-0011526, filed on Feb. 9, 2011, the contents of which in their entirety are herein incorporated by reference.

BACKGROUND OF THE INVENTION (a) Field of the Invention

This disclosure relates to a resist composition for a black matrix, a method for manufacturing a black matrix resist, a color filter display panel, and a manufacturing method thereof.

(b) Description of the Related Art

Liquid crystal displays are a type of flat panel display and are now widely used. A liquid crystal display has two display panels on which field generating electrodes, such as pixel electrodes and a common electrode, are disposed, and a liquid crystal layer is interposed between the panels. In the liquid crystal display, voltages are applied to the field generating electrodes so as to generate an electric field over the liquid crystal layer, and alignment of liquid crystal molecules of the liquid crystal layer is determined by the electric field. Accordingly, the polarization of incident light is controlled, thereby providing an image display.

The liquid crystal display includes a color filter that provides a desired color from white light that is modulated by the liquid crystal layer. The color filter has a structure in which a plurality of red ("R"), green ("G"), and blue ("B") pixels are disposed in a predetermined configuration on a transparent substrate, and each pixel is defined by a black matrix.

Conventional methods of manufacturing the color filter include a dyeing method, a pigment dispersion method, a printing method, and an electrode position method. However the manufacturing methods of the color filters undesirably repeat the manufacturing process for each color, resulting in decreased efficiency and increased manufacturing cost.

Accordingly, a color filter manufacturing method using an inkjet method has been proposed to simplify the manufacturing process and to reduce the manufacturing cost. The inkjet method includes discharging a desired color through an inkjet head. For example, ink drops of the red ("R"), green ("G") and blue ("B") colors may be discharged to manufacture the color filter.

When using the inkjet method to form the color filter, a black matrix may be used to prevent the mixing of inks of neighboring pixels, which may occur when the inks of different colors overflow between neighboring pixels. The black matrix may repel a liquid of the ink, such as water or an organic solvent included in the ink, thereby preventing overflow.

Plasma processing is used to provide a black matrix having liquid repellent properties. However it is difficult to provide a black matrix wherein an entire surface of the black matrix is uniformly liquid repellent. Thus there remains a need for an improved black matrix having improved liquid repellent properties.

BRIEF SUMMARY OF THE INVENTION

Disclosed is a resist composition for a black matrix, wherein the black matrix provides uniform liquid repellency to prevent pixel deterioration, a method of manufacturing a black matrix resist composition, a color filter display panel, and a manufacturing method thereof.

Disclosed is a resist composition for a black matrix, the resist composition including carbon nanotubes; a halosulfonic acid; an alcohol; an ammonium hydroxide compound; and a fluorosilane.

The carbon nanotubes may be included in a range of about 5 wt % (weight percent) to about 8 wt %, based on the total weight of the resist composition.

The halosulfonic acid may be included in a range of about 1 wt % to about 3 wt %, based on the total weight of the resist composition.

The alcohol may be included in a range of about 1 wt % to about 5 wt %, based on the total weight of the resist composition.

The ammonium hydroxide compound may be included in a range of about 1 wt % to about 4 wt %, based on the total weight of the resist composition.

The fluorosilane may be included in a range of about 9 wt % to about 12 wt %, based on the total weight of the resist composition.

The halosulfonic acid may comprise chlorosulfonic acid, bromosulfonic acid, iodosulfonic acid, or a combination comprising at least one of the foregoing.

The halosulfonic acid may be chlorosulfonic acid.

The alcohol may comprise a C1 to C10 alcohol.

The alcohol may be isopropanol.

The carbon nanotubes, the halosulfonic acid, the alcohol, the ammonium hydroxide compound, and the fluorosilane may chemically react to form a third compound of Formula 3:

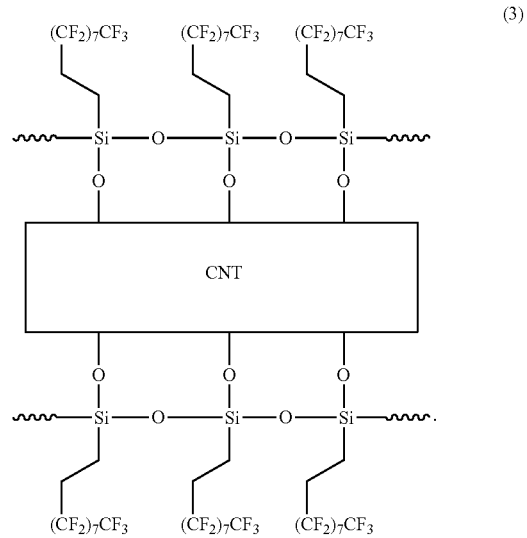

The resist composition may further include a polymerization initiator, a binder resin, and a photoinitiator.

Also disclosed is a method of forming a resist composition for a black matrix. The method includes contacting carbon nanotubes, a halosulfonic acid, and an alcohol to form a first compound; contacting an ammonium hydroxide compound and a fluorosilane to form a second compound; and combining the first compound and the second compound to form the resist composition.

The carbon nanotubes may be included in the resist composition in a range of about 5 wt % to about 8 wt %, based on the total weight of the resist composition.

The halosulfonic acid may be included in the resist composition in a range of about 1 wt % to about 3 wt %, based on the total weight of the resist composition.

The alcohol may be included in the resist composition in a range of about 1 wt % to 5 wt %, based on the total weight of the resist composition.

The ammonium hydroxide compound may be included in the resist composition in a range of about 1 wt % to about 4 wt %, based on the total weight of the resist composition.

The fluorosilane may be included in the resist composition in a range of about 9 wt % to about 12 wt %, based on the total weight of the resist composition.

The method of forming a resist composition for a black matrix may further comprising esterifying the resist composition to form a black matrix.

In an embodiment, the method may further include adding a polymerization initiator, a binder resin, and a photoinitiator.

Also disclosed is a color filter display panel including: a substrate including a pixel area; a partition on the substrate and defining an opening, the opening corresponding to the pixel area; and an ink layer disposed in the opening, wherein the partition includes a reaction product of a resist composition for a black matrix and the reaction product includes a third compound according to Formula 3:

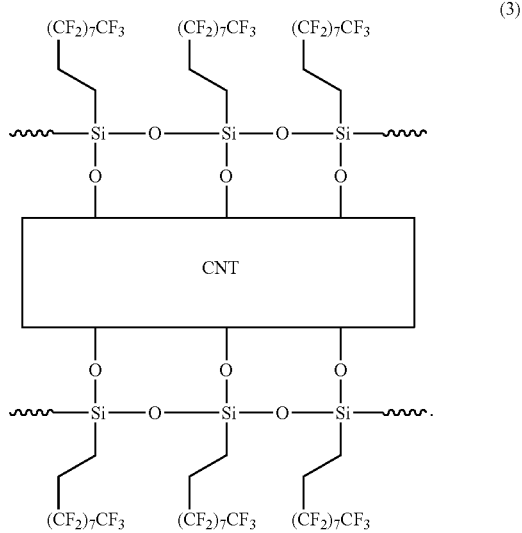

(3)

The third compound may be a reaction product of carbon nanotubes, a halosulfonic acid, an alcohol, an ammonium hydroxide compound, and a fluorosilane.

The carbon nanotubes may be included in the resist composition in a range of about 5 wt % to about 8 wt %, based on a total weight of the resist composition.

The halosulfonic acid may be included in the resist composition in a range of about 1 wt % to about 3 wt %, based on a total weight of the resist composition.

The alcohol may be included in the resist composition in a range of about 1 wt % to about 5 wt %, based on a total weight of the resist composition.

The ammonium hydroxide compound may be included in the resist composition in a range of about 1 wt % to about 4 wt %, based on a total weight of the resist composition.

The fluorosilane may be included in the resist composition in a range of about 9 wt % to about 12 wt %, based on a total weight of the resist composition.

Also disclosed is a method for manufacturing a color filter display panel. The method includes: providing a resist composition for a black matrix; forming a partition on a substrate, the partition including a reaction product of the resist composition and defining an opening on the substrate; and injecting ink in the opening, wherein the resist composition includes a first compound which is a reaction product of carbon nanotubes, a halosulfonic acid, and alcohol, and a second compound which is a reaction product of an ammonium hydroxide compound and a fluorosilane, wherein the partition includes a third compound which is a reaction product of the first compound and the second compound.

Also disclosed is a resist composition for a black matrix, the resist composition comprising: a first compound which is a reaction product of carbon nanotubes, a halosulfonic acid, and an alcohol; and a second compound which is a reaction product of an ammonium hydroxide compound and a fluorosilane.

In an embodiment, the ink is injected into the pixel area enclosed by the partition and having uniform liquid repellency, thereby preventing a pixel defect.

Also disclosed is a resist composition for a black matrix, the resist composition including: a first compound which is a reaction product of carbon nanotubes, a halosulfonic acid, and an alcohol, and a second compound which is a reaction product of an ammonium hydroxide compound and a fluorosilane.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE EMBODIMENTS

Figure 1:
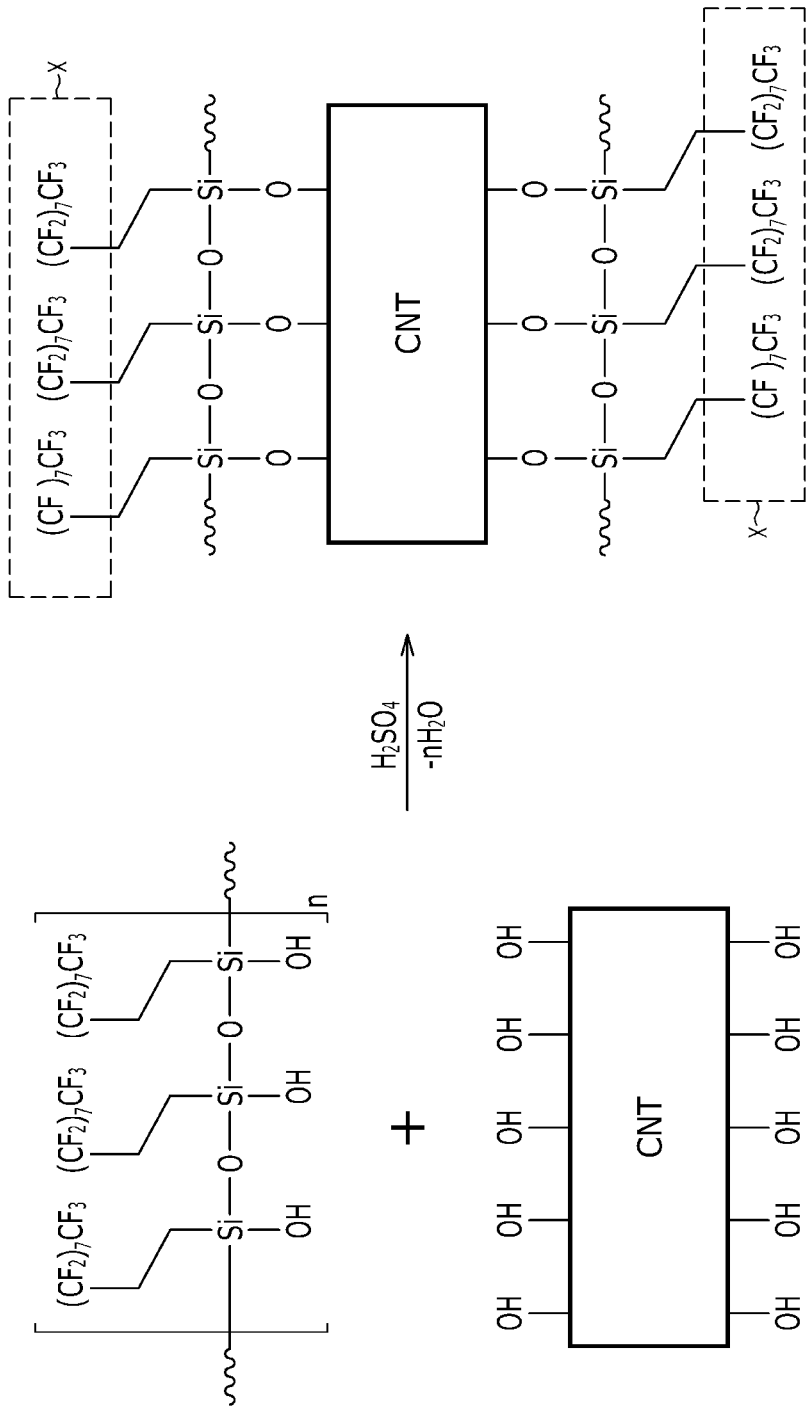
FIG. 1 is a reaction scheme showing an embodiment of a process for forming the third compound of a black matrix.

An exemplary embodiment will hereinafter be described in further detail with reference to the accompanying drawings. As those skilled in the art would realize, the disclosed embodiments may be modified in various different ways, all without departing from the spirit or scope of the present disclosure. The present exemplary embodiments provide complete disclosure and complete information of the scope of the present disclosure to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A resist composition for a black matrix comprises carbon nanotubes; a halosulfonic acid; an alcohol; an ammonium hydroxide compound; and a fluorosilane. In an embodiment, the resist composition comprises carbon nanotubes, isopropanol, chlorosulfonic acid, ammonium hydroxide, and a fluorosilane of the formula $C_{13}H_{13}F_{17}O_3Si$.

Carbon nanotubes are elongated tubular bodies comprising one or a plurality of cylindrically rolled graphite films that may be arranged telescopically. The nanotubes may be hollow and have a linear fullerene structure. The carbon nanotubes may comprise single-wall carbon nanotubes or multi-wall carbon nanotubes. A combination comprising at least one of the foregoing may be used. In an embodiment the carbon nanotubes are single-wall carbon nanotubes. Carbon nanotubes are primarily carbon, although the nanotube fiber may further comprise other atoms, such as boron, nitrogen, or one or more of various metals. Here, the carbon nanotubes may comprise a material represented by a chemical formula $C_{60}$ in which hexagonal shapes including six carbons are connected to each other thereby forming a tube shape. Carbon nanotubes may have diameters ranging from about 1 nanometer (nm) for a single-wall carbon nanotube up to 3 nm, 5 nm, 10 nm, 30 nm, 60 nm, or 100 nm for single-wall or multi-wall carbon nanotubes. The carbon nanotubes may range in length from 50 nm up to 1 millimeter (mm), 1 centimeter (cm), 3 cm, or 5 cm.

The alcohol may be a C1 to C10 aliphatic or aromatic alcohol. A combination comprising at least one alcohol may be used. In an embodiment the alcohol is a C1 to C10 aliphatic alcohol, specifically a C1 to C6 aliphatic alcohol, even more specifically methanol, ethanol, isopropanol, n-propanol, n-butanol, or a combination comprising at least one of the foregoing. In another embodiment the alcohol is isopropanol, and may include a compound represented by the chemical formula $C_3H_7OH$.

The halosulfonic acid may comprise chlorosulfonic acid, bromosulfonic acid, or iodosulfonic acid. A combination comprising at least one of the foregoing may be used. In an embodiment the halosulfonic acid is chlorosulfonic acid comprises a compound represented by the chemical formula $HSO_3Cl$.

The ammonium hydroxide compound contains a tetrasubstituted nitrogen group and a hydroxyl counterion. Exemplary ammonium hydroxide compounds are of the formula $R_4N^+OH^-$ wherein each R may be the same or different C1 to C8 moiety, which may be aliphatic, aromatic, or a combination thereof, and which may be unsubstituted or substituted with a halogen and/or hydroxyl group. Exemplary ammonium hydroxide compounds include ammonium hydroxide, benzyl trimethyl ammonium hydroxide, tetraethyl ammonium hydroxide, tetramethyl ammonium hydroxide, tetra-n-butyl ammonium hydroxide, tetra-n-propyl ammonium hydroxide, methyl triethanol ammonium hydroxide, benzyl dimethyl ethanol ammonium hydroxide, benzyltriethyl ammonium hydroxide, benzyltributyl ammonium hydroxide, octadecyl trimethyl ammonium hydroxide, tetrahexyl ammonium hydroxide, or tetraoctyl ammonium hydroxide. A combination comprising at least one of the foregoing may be used. The ammonium hydroxide compound may be ammonium hydroxide and may include a compound represented by the chemical formula $NH_4OH$.

The fluorosilane is a compound of the formula $R'SiW_3$ wherein R' is a C4 to C36 moiety which may be aliphatic, aromatic, or a combination thereof, specifically a C6 to C18 aliphatic moiety, more specifically a C8 to C12 aliphatic moiety, further wherein R' is substituted with one or more fluorine atoms, specifically 1-73 fluorine atoms, specifically 3 to 37 fluorine atoms, more specifically 6 to 23 fluorine atoms; and wherein each W is the same or different, and is a halogen, specifically chlorine, or an —OR" moiety wherein R" is a C1-C3 alkyl group, specifically a methyl group. A combination comprising different fluorosilanes may be used. Exemplary fluorosilanes include (heptadecafluoro-1,1,2,2-tetrahydrodecyl)trimethoxysilane, (heptadecafluoro-1,1,2,2-tetrahydrodecyl)triethoxysilane, (heptadecafluoro-1,1,2,2-tetrahydrodecyl)trichlorosilane, (heptadecafluoro-1,1,2,2-tetrahydrodecyl)methyldichlorosilane, (heptadecafluoro-1,1,2,2-tetrahydrodecyl)dimethylchlorosilane, hexadecafluorod odec-11-en-1-yltrimethoxysilane, or (3-heptafluoroisopropoxy)propyltrichlorosilane. In an embodiment, the fluorosilane is of the formula $R'Si(OR")_3$ wherein R' is a C6 to C 18 aliphatic moiety substituted with 3 to 37, specifically 6 to 33 fluorine atoms, and each R″ is the same or different and is a methyl or ethyl group In another embodiment the fluorosilane may be (heptadecafluoro-1,1,2,2-tetrahydrodecyl)trimethoxysilane and may include a compound represented by the chemical formula $C_{13}H_{13}F_{17}O_3Si$.

In an embodiment, the resist composition for the black matrix may comprise the carbon nanotubes in a range of about 1 weight percent (wt %) to about 15 wt %, specifically about 3 wt % to about 10 wt %, more specifically about 5 wt % to about 8 wt %, based on a total weight of the resist composition.

The resist composition for the black matrix may comprise the halosulfonic acid in a range of about 0.1 wt % to about 9 wt %, specifically about 0.5 wt % to about 6 wt %, more specifically about 1 wt % to about 3 wt %, based on the total weight of the resist composition. In an embodiment, the resist composition for the black matrix comprises chlorosulfonic acid in a range of about 1 wt % to about 3 wt %.

The resist composition for the black matrix may comprise the alcohol in a range of about 0.1 wt % to about 15 wt %, specifically about 0.5 wt % to about 10 wt %, more specifically about 1 wt % to about 5 wt %, based on the total weight of the resist composition. In an embodiment, the resist composition for the black matrix comprises isopropanol in a range of about 1 wt % to about 5 wt %, The resist composition for the black matrix may comprise the ammonium hydroxide compound in a range of about 0.1 wt % to about 12 wt %, specifically about 0.5 wt % to about 8 wt %, more specifically about 1 wt % to about 4 wt %, based on the total weight of the resist composition. In an embodiment, the resist composition for the black matrix comprises ammonium hydroxide in a range of about 1 wt % to about 4 wt %, based on the total weight of the resist composition.

The resist composition for the black matrix may comprise the fluorosilane in a range of about 3 wt % to about 36 wt %, specifically about 6 wt % to about 24 wt %, more specifically about 9 wt % to about 12 wt %, based on the total weight of the resist composition. In an embodiment, the resist composition for the black matrix comprises the fluorosilane in a range of about 9 wt % to about 12 wt %, based on the total weight of the resist composition.

In additional, the resist composition for the black matrix may further include a polymerization initiator, a binder resin, and a photoinitiator.

The polymerization initiator may comprise an ethylenically unsaturated bond, and may be a compound capable of initiating polymerization of the binder resin by an addition polymerization. The polymerization initiator is not specifically limited.

The binder resin may an acrylate or methacrylate-containing copolymer, an epoxy compound having two or more epoxy groups, or a polycarboxylic acid. A combination comprising at least one of the foregoing may be used.

The resist composition for the black matrix may further include one or more of an additive. The one or more additives may tetramethyl orthosilicate, sulfuric acid, dipentaerythritol hexacrylate, or a polyimide. A combination comprising at least one of the foregoing may be used.

Hereinafter, a method for forming a resist composition for a black matrix and a black matrix resist will be further disclosed.

A method for forming a resist composition for a black matrix may comprise contacting carbon nanotubes, a halosulfonic acid, and an alcohol to form a first compound; contacting an ammonium hydroxide compound and a fluorosilane to form a second compound; and combining the first compound and the second compound to form the resist composition. The resist composition may be esterified to form a black matrix.

In an embodiment, the method for forming the resist composition includes forming the first compound, which may be represented schematically by Formula 1, by contacting (e.g., melting) carbon nanotubes in an alcohol (e.g., isopropanol) and a halosulfonic acid (e.g., chlorosulfonic acid) to provide a hydroxyl group on an edge of the carbon nanotubes. Without being bound by theory, the hydroxyl group may be bonded to a carbon atom disposed at the edge of the carbon nanotubes ("CNT") to provide the first compound.

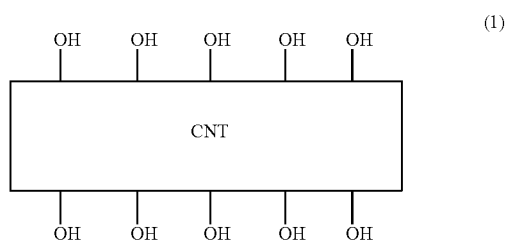

(1)

The carbon nanotubes, the alcohol, and the halosulfonic acid may be contacted at a temperature in a range of about 60° C. to about 110° C., specifically about 70° C. to about 100° C., more specifically about 80 ° C. to about 90 ° C. for about 10 minutes to about 90 minutes, specifically about 20 minutes to about 60 minutes, more specifically about 30 minutes.

Next, the ammonium hydroxide compound and the fluorosilane are contacted (e.g., added) and, without being bound by theory, it is believed that a condensation reaction is performed to form the second compound of Formula 2. In Formula 2, n is a natural number having a value, for example, of 1 to 10,000, or 3 to 5,000, or 5 to 1,000, or 10 to 500.

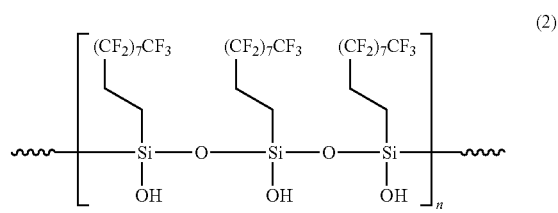

(2)

The ammonium hydroxide compound and the fluorosilane may be combined separately, the second compound formed, and then the second compound added to the first compound. Alternatively, the ammonium hydroxide compound and the fluorosilane may be added to the first compound. Again without being bound by theory, FIG. 1 is a reaction scheme showing the preparation of a third compound, which may be a component (e.g., a primary component) of an embodiment of a black matrix. In an embodiment, the black matrix comprises about 50 percent (%) to 100%, specifically about 60% to 99%, more specifically about 70% to about 98% of the third compound. In an embodiment, the black matrix consists of the third compound.

Again without being bound by theory, referring to FIG. 1, an embodiment of the method of forming the black matrix includes forming the third compound by contacting (e.g., mixing) the first compound and the second compound and performing a silanation reaction. The third compound comprises a liquid repellency unit X including a plurality of functional groups. In an embodiment, each functional group may be represented by the chemical formula $-(CF_2)_7CF_3$. The functional groups are side chains of the third compound, and are bonded to the edge of the third compound of Formula 3.

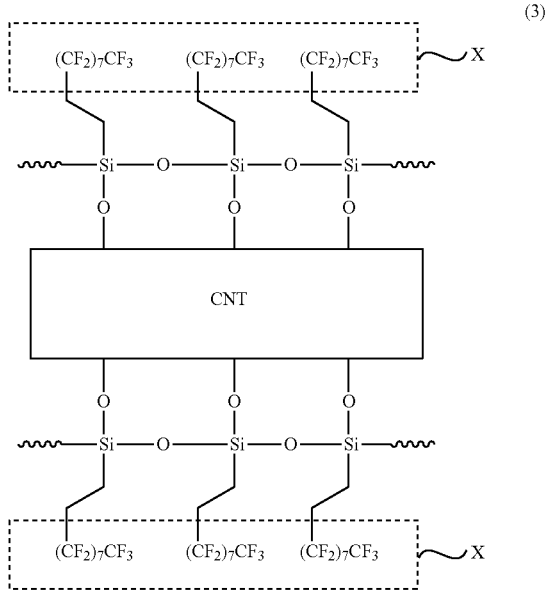

(3)

Figure 2:
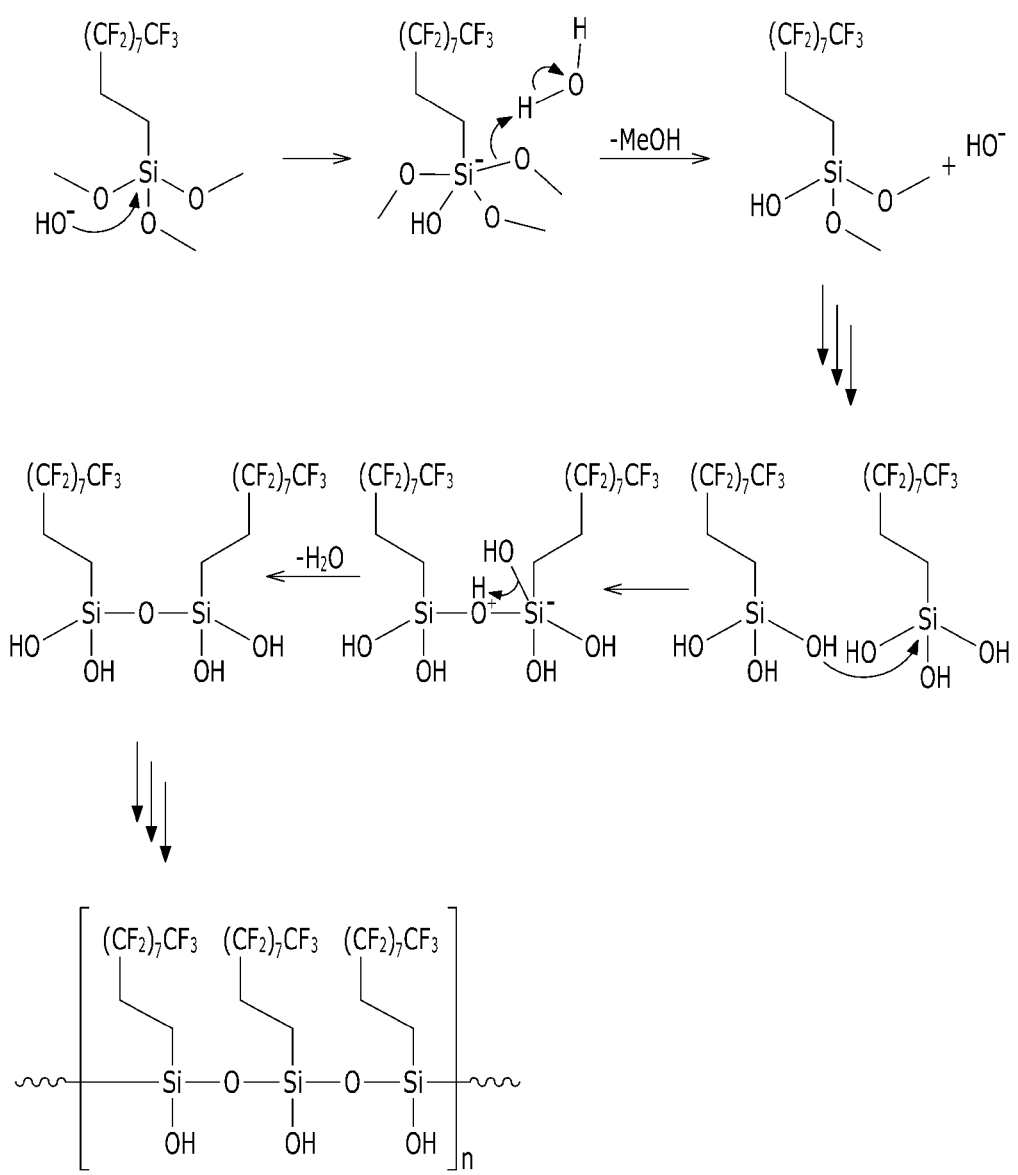
FIG. 2 is a reaction scheme showing an embodiment of a mechanism of a condensation reaction.

FIG. 2 is a reaction scheme showing an embodiment of a possible mechanism of a condensation reaction.

Without being bound by theory, the condensation reaction for forming the second compound may progress with a mechanism shown in FIG. 2.

The method of forming the black matrix resist may further include adding the polymerization initiator, the binder resin, and the photoinitiator.

In an embodiment, when forming the black matrix resist, the carbon nanotubes may be included in the resist composition in a range of about 1 wt % to about 15 wt %, specifically about 3 wt % to about 10 wt %, more specifically about 5 wt % to about 8 wt %, based on the total weight of the resist composition. The halosulfonic acid may be included in the resist composition in a range of about 0.1 wt % to about 9 wt %, specifically about 0.5 wt % to about 6 wt %, more specifically about 1 wt % to about 3 wt %, based on the total weight of the resist composition. In an embodiment the halosulfonic acid is chlorosulfonic acid, and the chlorosulfonic acid is contained in a range of about 1 wt % to about 3 wt %, based on the total weight of the resist composition. The alcohol may be included in the resist composition in a range of about 0.1 wt % to about 15 wt %, specifically about 0.5 wt % to about 10 wt %, more specifically about 1 wt % to about 5 wt %. In an embodiment the alcohol is isopropanol, and the isopropanol is included in a range of about 1 wt % to about 5 wt %, based on the total weight of the resist composition. The ammonium hydroxide compound may be included in the resist composition in a range of about 0.1 wt % to about 12 wt %, specifically about 0.5 wt % to about 8 wt %, more specifically about 1 wt % to about 4 wt %, based on the total weight of the resist composition. In an embodiment the ammonium hydroxide compound is ammonium hydroxide, and the ammonium hydroxide is included in the resist composition in a range of about 1 wt % to about 4 wt %, based on the total weight of the resist composition. In an embodiment the fluorosilane is included in the resist composition in a range of about 3 wt % to about 36 wt %, specifically about 6 wt % to about 24 wt %, more specifically about 9 wt % to about 12 wt %, based on the total weight of the resist composition.

Figure 3:
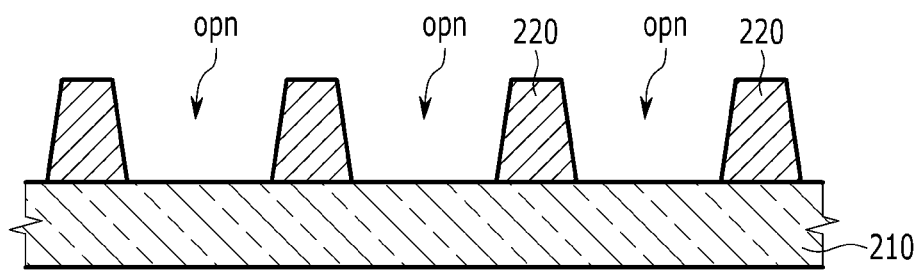
FIG. 3 and FIG. 4 are cross-sectional views of an embodiment of a color filter display panel.
Figure 4:
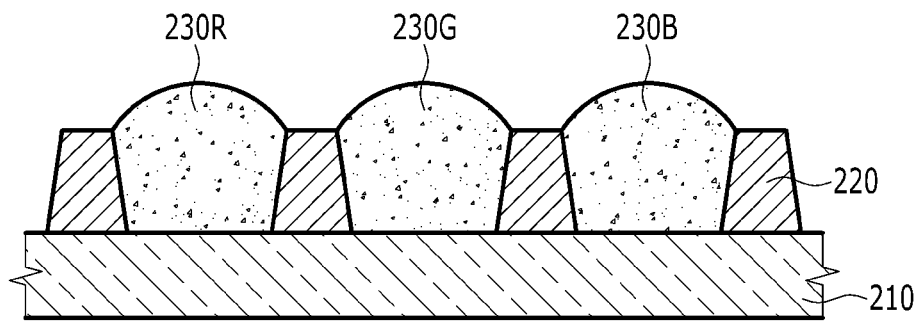

FIG. 3 and FIG. 4 are cross-sectional views of an embodiment of a color filter display panel.

Next, an embodiment of a color filter display panel will be further described with reference to FIG. 3 and FIG. 4.

Referring to FIG. 3, a plurality of openings opn are defined by transparent substrate 210 and a plurality of partitions 220. The substrate 210 has a pixel area (not shown) corresponding to the plurality of openings opn.

The partition 220 may be formed by disposing (e.g., coating) the above-disclosed resist composition on the substrate 210 and patterning it using spin coating, for example. A coating thickness of the resist composition on the substrate 210 may be in a range of about 1.2 µm to about 2.5 µm. When the coating thickness is less than about 1.2 µm, it is difficult to dispose a sufficient amount of ink in the opening opn of the partition 220 to provide a sufficient color concentration and color reproducibility, and when the thickness is more than about 2.5 µm, it is difficult to manufacture the color filter display panel with the partition pattern with sufficient resolution, and a step between the ink layer and the partition may be such that the design of the liquid crystal cell is difficult.

Referring to FIG. 4, first, second, and third ink layers 230R, 230G, and 230B, respectively, are positioned in the opening opn between the partitions 220. The first, second, and third ink layers 230R, 230G, and 230B may be disposed (e.g., formed) by injecting the ink using the inkjet method and dry hardening, heat hardening, or ultraviolet ray hardening, as desired.

Before forming the first, second, and third ink layers 230R, 230G, and 230B, a plasma treatment may be performed on the surface on which the ink is injected, such as an inside surface of the openings between the partitions 220, to provide the surface ink phobic properties.

The partitions 220 comprise a material including the liquid repellency unit X in the above-disclosed third compound. The partitions 220 substantially reduce or effectively prevent overflowing of the ink from the partition 220, and invasion of the ink into an adjacent opening opn may be substantially reduced or effectively prevented. Accordingly, the mixing of colors when forming the first, second, and third ink layers 230R, 230G, and 230B by the inkjet method may be substantially reduced or effectively prevented.

Next, a contact angle according to content of a resist composition for the black matrix will be disclosed.

Table 1 shows a content, in wt % based on the total weight of the resist composition, of a resist composition for a black matrix in Experimental Example 1 to Experimental Example 8.

TABLE 1

|  | Carbon nanotube | Fluorosilane | Tetramethyl orthosilicate | Ammonium hydroxide | Isopropanol | Chlorosulfonic acid | Sulfuric acid | Dipentaerythritol hexacrylate | Polyimide |
|---|---|---|---|---|---|---|---|---|---|
| Experimental Example 1 | 1-2 | 9-12 | 1-3 | 1-4 | 1-5 | 1-3 | 1-2 | 3-4 | 1-2 |
| Experimental Example 2 | 3-4 | 9-12 | 1-3 | 1-4 | 1-5 | 1-3 | 1-2 | 3-4 | 1-2 |
| Experimental Example 3 | 5-6 | 9-12 | 4-7 | 1-4 | 1-5 | 1-3 | 3-4 | 5-6 | 3-4 |

TABLE 1-continued

|  | Carbon nanotube | Fluorosilane | Tetramethyl orthosilicate | Ammonium hydroxide | Isopropanol | Chlorosulfonic acid | Sulfuric acid | Dipentaerythritol hexacrylate | Polyimide |
|---|---|---|---|---|---|---|---|---|---|
| Experimental Example 4 | 7-8 | 9-12 | 4-7 | 1-4 | 1-5 | 1-3 | 3-4 | 5-6 | 3-4 |
| Experimental Example 5 | 9-10 | 9-12 | 8-11 | 1-4 | 1-5 | 1-3 | 5-6 | 7-8 | 5-6 |
| Experimental Example 6 | 11-12 | 9-12 | 8-11 | 1-4 | 1-5 | 1-3 | 5-6 | 7-8 | 5-6 |
| Experimental Example 7 | 13-14 | 9-12 | 12-15 | 1-4 | 1-5 | 1-3 | 7-8 | 9-10 | 7-8 |
| Experimental Example 8 | 15-16 | 9-12 | 12-15 | 1-4 | 1-5 | 1-3 | 7-8 | 9-10 | 7-8 |

Table 2 shows a contact angle and a degree of dispersion of the first ink, the second ink, and the third ink according to Experimental Example 1 to Experimental Example 8. The first ink, the second ink, and the third ink may be respectively a red ink, a green ink, and a blue ink. The contact angle may be defined as an angle between a free surface of a liquid and a plane surface of a solid when the liquid and the solid contact each other.

As is disclosed in Table 2, the contact angle and the degree of dispersion are excellent in Experimental Example 3 and Experimental Example 4. The resist composition according to Experimental Example 3 and Experimental Example 4 included carbon nanotubes in a range of about 5 wt % to about 8 wt %, chlorosulfonic acid in a range of about 1 wt % to about 3 wt %, isopropyl alcohol in a range of about 1 wt % to about 5 wt %, ammonium hydroxide in a range of about 1 wt % to about 4 wt %, and fluorosilane in a range of about 9 wt % to about 12 wt %, and provided surprisingly the best characteristics.

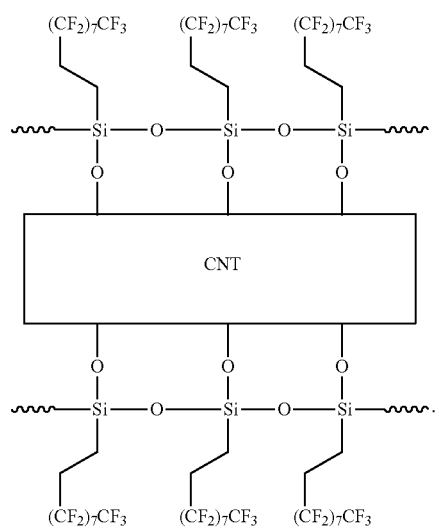

TABLE 2

|  |  | Experimental Example 1 | Experimental Example 2 | Experimental Example 3 | Experimental Example 4 | Experimental Example 5 | Experimental Example 6 | Experimental Example 7 | Experimental Example 8 |
|---|---|---|---|---|---|---|---|---|---|
| Contact angle | First ink | 29.1 | 33.7 | 38.1 | 37.2 | 37.1 | 37.3 | 37.2 | 37.1 |
|  | Second ink | 25.8 | 31.8 | 37.6 | 35.9 | 35.4 | 35.8 | 35.6 | 35.5 |
|  | Third ink | 25.3 | 30.6 | 35.9 | 34.2 | 34.6 | 34.5 | 34.2 | 34.2 |
| Degree of Dispersion |  | GOOD |  | GOOD |  | NOT GOOD |  | BAD |  |

While this disclosure includes what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resist composition for a black matrix, the resist composition comprising:
    carbon nanotubes;
    a halosulfonic acid;
    an alcohol;
    an ammonium hydroxide compound; and
    a fluorosilane,
    wherein the carbon nanotubes, the halosulfonic acid, the alcohol, the ammonium hydroxide compound, and the florosilane chemically react to form a third compound of Formula 3:

2. The resist composition for the black matrix of claim 1, wherein
    the carbon nanotubes are included in a range of about 5 weight percent to about 8 weight percent, based on the total weight of the resist composition.

3. The resist composition for the black matrix of claim 2, wherein
    the halosulfonic acid is included in a range of about 1 weight percent to about 3 weight percent, based on the total weight of the resist composition.

4. The resist composition for the black matrix of claim 3, wherein
    the alcohol is included in a range of about 1 weight percent to about 5 weight percent, based on the total weight of the resist composition.

5. The resist composition for the black matrix of claim 4, wherein the ammonium hydroxide compound is included in a range of about 1 weight percent to about 4 weight percent, based on the total weight of the resist composition.

6. The resist composition for the black matrix of claim 5, wherein the fluorosilane is included in a range of about 9 weight percent to about 12 weight percent, based on the total weight of the resist composition.

7. The resist composition for the black matrix of claim 1, wherein the halosulfonic acid comprises chlorosulfonic acid, bromosulfonic acid, iodosulfonic acid, or a combination comprising at least one of the foregoing.

8. The resist composition for the black matrix of claim 1, wherein the halosulfonic acid is chlorosulfonic acid.

9. The resist composition for the black matrix of claim 1, wherein the alcohol comprises a C1 to C10 alcohol.

10. The resist composition for the black matrix of claim 9, wherein the alcohol is isopropanol.

11. A resist composition for the black matrix of claim 1, wherein the third compound is a reaction product of a first compound and a second compound, and wherein the first compound is a reaction product of carbon nanotubes, a halosufonic acid, and an alcohol; and the second compound is a reaction product of a ammonium hydroxide compound and a flurosilane.

12. The resist composition for the black matrix of claim 1, further comprising a polymerization initiator, a binder resin, and a photoinitiator.

13. A method of forming a resist composition for a black matrix, the method comprising:

contacting carbon nanotubes, a halosulfonic acid, and an alcohol to form a first compound;

contacting an ammonium hydroxide compound and a fluorosilane to form a second compound; and combining the first compound and the second compound to form the resist composition, wherein the carbon nanotubes, the halosulfonic acid, the alcohol, the ammonium hydroxide compound, and the fluorosilane chemically react to form a third compound of Formula 3:

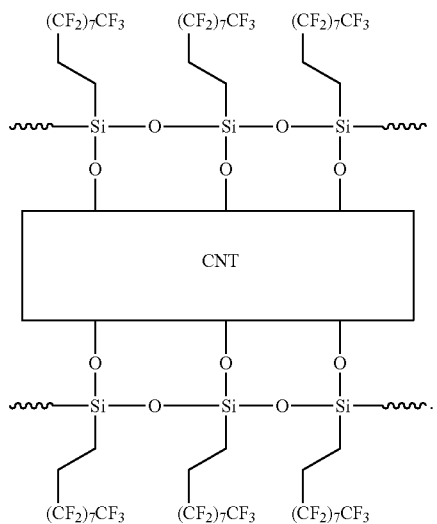

14. The method of claim 13, wherein the carbon nanotubes are included in the resist composition in a range of about 5 weight percent to about 8 weight percent, based on the total weight of the resist composition.

15. The method of claim 14, wherein the halosulfonic acid is included in the resist composition in a range of about 1 weight percent to about 3 weight percent, based on the total weight of the resist composition.

16. The method of claim 15, wherein the alcohol is included in the resist composition in a range of about 1 weight percent to about 5 weight percent, based on the total weight of the resist composition.

17. The method of claim 16, wherein the ammonium hydroxide compound is included in the resist composition in a range of about 1 weight percent to about 4 weight percent, based on the total weight of the resist composition.

18. The method of claim 17, wherein the fluorosilane is included in the resist composition in a range of about 9 weight percent to about 12 weight percent, based on the total weight of the resist composition.

19. The method of claim 13, further comprising esterifying the resist composition to form a black matrix.

20. The method of claim 13, further comprising adding a polymerization initiator, a binder resin, and a photoinitiator.

* * * * *